United States Patent
Burckhardt et al.

[11] Patent Number: 5,599,076
[45] Date of Patent: Feb. 4, 1997

[54] PROCESS FOR DETERMINATION OF FRICTION/SLIP CHARACTERISTICS OF THE TIRES OF A ROAD VEHICLE AND SLIP CONTROL SYSTEM FOR CARRYING OUT THE PROCESS

[75] Inventors: Manfred Burckhardt, Waiblingen; Gerd Eilert, Schwaikheim; Rainer Freitag, Nuertingen; Armin Mueller, Backnang; Reinhold Schoeb, Filderstadt; Rainer Spiecker, Kernen; Sinan Kazan, Esslingen; Richard Zimmer, Fellbach, all of Germany

[73] Assignee: Mercedes-Benz AG, Germany

[21] Appl. No.: 256,250

[22] PCT Filed: Jan. 4, 1993

[86] PCT No.: PCT/EP93/00005
§ 371 Date: Oct. 5, 1994
§ 102(e) Date: Oct. 5, 1994

[87] PCT Pub. No.: WO93/12960
PCT Pub. Date: Jul. 8, 1993

[30] Foreign Application Priority Data

Jan. 3, 1992 [DE] Germany .......................... 42 00 046.7

[51] Int. Cl.⁶ .................................................. B60T 8/00
[52] U.S. Cl. .......................... 303/150; 303/148; 303/155
[58] Field of Search .............................. 303/113.1, 113.4, 303/114.1, 111, DIG. 4, DIG. 3, 113.5, 150, 149, 148, 146, 155; 60/547.1, 547.2, 557, 561, 562

[56] References Cited

U.S. PATENT DOCUMENTS 3,967,862 7/1976 Hunter et al. .
4,111,496 9/1978 Leiber .................................. 303/114.1
4,645,272 2/1987 Leiber .................................. 303/114.1
4,755,008 7/1988 Imoto et al. ....................... 303/DIG. 4
5,096,267 3/1992 Volz ..................................... 303/119.2

FOREIGN PATENT DOCUMENTS 0393375 10/1990 European Pat. Off. .
3941409 4/1991 Germany .
4010212 10/1991 Germany .
2045371 10/1980 United Kingdom ................ 303/114.1

Primary Examiner—Matthew C. Graham
Attorney, Agent, or Firm—Evenson, McKeown, Edwards & Lenahan P.L.L.C.

[57] ABSTRACT

A slip control system determines friction/slip characteristics of tires of a road vehicle equipped both with an antilock system to permit an individual brake pressure control on individual vehicle wheels. The front wheel brakes are connected to a primary output pressure space of the tandem master cylinder, and the rear wheel brakes are connected to a secondary output pressure space of the tandem master cylinder. A first bore stage of a housing of the tandem master cylinder forms a housing-defined boundary of the secondary output pressure space. An inner piston flange movably seals off a pressureless downstream chamber in relation to an inner portion of the first bore stage. An intermediate wall of the housing delimits the bore stage relative to a central bore stage which extends from a third bore stage receiving a primary piston. An actuating piston is displaceably guided in the central bore stage in a pressure tight manner and forms an axially movable, inner boundary of the primary output pressure space relative to a pressureless downstream chamber in the central bore stage which is bounded by the intermediate wall. An annular space is bounded in an axially movable manner by an inner piston flange of a secondary piston and by the intermediate wall and is connected to the pressure output of the controllable pressure source.

10 Claims, 3 Drawing Sheets

PROCESS FOR DETERMINATION OF FRICTION/SLIP CHARACTERISTICS OF THE TIRES OF A ROAD VEHICLE AND SLIP CONTROL SYSTEM FOR CARRYING OUT THE PROCESS

BACKGROUND AND SUMMARY OF THE INVENTION

The present invention relates to a process for determination of the friction/slip characteristics of a road vehicle tires, in which the vehicle which is equipped with an antilock system configured on the basis of an individual wheel control, according to which, in the traction mode of the vehicle, the course of the respective tire characteristic in the entire μ/λ field is concluded from pairs of measured values of the slip and of the coefficient of friction utilized at a given slip.

German Patent Application P 41 02 301.3 describes a process which in the traction mode of the vehicle, the tire characteristics of the driven vehicle wheels are determined and, on account of the equivalence of drive slip and brake slip, the thus determined tire characteristics are also used for the determination of brake slip thresholds which when exceeded cause the antilock system of the vehicle to respond. The maximum utilizable coefficients of friction (the μ-maximum of the respective tire characteristic are concluded from the spin behavior of the driven vehicle wheels, the speed of rotation of which drastically increases when a slip value corresponding to the maximum of the characteristic is exceeded. A precise determination of the tire characteristics in the braking mode is not possible in accordance with this known process.

Further, WO 85/02592 (PCT/EP84/00402) discloses a process for the determination of an optimal slip value λ at at least one wheel of a vehicle for controlling the brake force with the use of the wheel speed $V_R$ and of the vehicle speed $V_F$ of at least approximate signals. During the journey, the slip λ is varied by altering the basic pressure $P_B$ and at individual instants of measurement (k, k+1, . . .) signal value combinations of the wheel speed $V_R^*$ (K), of the vehicle speed $V_F^*$ (K), of the brake pressure $P_B^*$ (K) and of the normal reaction force $F_A^*$ (K) effective at the wheel are determined; following the availability of a plurality of such signal value combinations, determined respectively one following the other by a measurement time interval Δt, for various values of the slip λ, a function $V_R$ (K+1)=f is determined. This function represents the solution of a system of equations with unknown coefficients $α_n$, the coefficients of which can be determined with the aid of this system of equations. From these coefficients $α_n$ there are then determined coefficients $α_n$, which are coefficients of a general description of the μ slip curve μ=f($V_R$,$V_F$), from the course of which the position of the optimal slip value $λ_{opt}$ is then determined.

This known process requires, during a braking, measurement of parameters which are fundamentally affected by a high error. For example, the wheel normal reaction force $F_A$, which can be "measured" only indirectly or, in the case of a more direct measurement (e.g. with the aid of strain gauges) by which the spring strain of wheel springs can be picked up, is exposed to considerable disturbance variables as a result of the resilient spring movements. Also the value of the vehicle speed $V_F$ is determinable only very imprecisely, during a braking in which all vehicle wheels are affected by a brake slip, this being at all events the case where the vehicle speed is obtained from an averageing of individual wheel speeds which are picked up by wheel speed-of-rotation sensors individually allocated to the vehicle wheels. Consequently, the known process, which requires the performance of a multiplicity of computation steps, converges only very slowly. That is, a reasonably reliable course—one which is close to reality —of the thus determinable μ slip curves can be achieved only after a multiplicity of brakings, but this multiplicity is not carried out in the course of a normal journey.

Accordingly, an object of the present invention is to provide an improved process which permits, in the braking mode of the vehicle, within a short period of time, to a large extent precise determination of the tire characteristic, a knowledge of which is a prerequisite for a slip control to maintain the dynamic stability of a vehicle within the widest possible range, as well as to an improved slip control system with which the process can be carried out.

This object has been achieved by a process in which (d) in an initial phase of a controlled braking linked with moderate vehicle retardation, using brake pressure on only a wheel brake of an individual vehicle wheel and dimensioning the brake pressure in an initial rising phase so that increasing initial retardation in accordance with the driver's wish is at least approximately obtained; (e) as soon as, as a result of just the braking of the test wheel, at least one of the vehicle retardation, z, no longer increases and the braked vehicle wheel is retarded more strongly than corresponds to a predetermined threshold value, interrupting the test braking and continuing the braking by pressure action on other vehicle wheels; and (f) carrying out test braking phases according to steps (d) and (e) in cyclic sequence for all remaining vehicle wheels and by a slip control system in which the front wheel brakes (11, 12) connected to a primary output pressure space (56) of the tandem master cylinder (16') and the rear wheel brakes (13, 14) are connected to a secondary output pressure space (57) of the tandem master cylinder (16)'), a first bore stage (63) of a housing (64) of the tandem master cylinder (16'), forming a housing-defined boundary of the secondary output pressure space (57), within which first bore state (63) a secondary piston (59) with an outer piston flange (74) delimits the secondary output pressure space (57) in relation to a pressureless downstream chamber (82), an inner piston flange (73) movably sealing off the downstream chamber (82) in relation to an inner portion of the first bore stage (63) an intermediate wall (68) of the housing (64) delimiting the bore stage (63) relative to a central bore stage (66) which extends from a third bore stage (61) receiving a primary piston (58), a cross-sectional area ($A_1$) of the third bore stage (61) is greater than a cross-sectional area ($A_3$) of the central bore stage (66), an actuating piston (69) being displaceably guided in the central bore stage (66) in a pressure tight manner, the actuating piston (69) forming an axially movable, inner boundary of the primary output pressure space (56) relative to a pressureless downstream chamber (86) in the central bore stage (66) which is bounded by the intermediate wall (68), the actuating piston (69) being provided with a thrust rod (71) configured to axially penetrate the central downstream chamber (86) and to pass displaceably in a pressure tight manner through a central bore (72) of the intermediate wall (68) and being axially supported on an inner piston flange (73) of the secondary piston (59), an annular space (96) which is bounded in an axially movable manner by the inner piston flange (73) of the secondary piston (59) and by the intermediate wall (68), centrally penetrated by the thrust rod (71) and is connected to the pressure output (42) of the controllable pressure source (40).

According to the present invention, in an initial phase of a controlled braking linked with moderate vehicle retardation, the wheel brake of only a single vehicle wheel is acted upon by brake pressure and this brake pressure is rapidly increased such that a development of the vehicle retardation which is in accordance with the driver's wish is obtained. In this initial test phase, the absolute brake slip is continuously measured, and is made possible with very great precision because at least the unbraked vehicle wheels roll freely and thereby very precise information can be obtained on the vehicle speed, a precise knowledge of which is an essential prerequisite for the precise determination of the slip. The vehicle retardation can likewise be determined very precisely by reference to the wheel speeds of rotation of the non-retarded vehicle wheels. The vehicle wheel subjected to the braking can be braked to very close to the "lock limit", since the freely rolling vehicle wheels provide the vehicle with sufficient lateral guidance force in order to guarantee the required stability. The test braking is interrupted as soon as, as a result of just the braking of the test wheel, the vehicle retardation z increases no further and/or the braked vehicle wheel is retarded more strongly than corresponds to a predetermined threshold value. By cyclic performance of these measures, the applicable tire characteristic is determined for all vehicle wheels and can be updated repeatedly, depending upon the duration of the journey or respectively the number of brakings executed during a journey. Thus, changes of the tire characteristics can also be picked up and then utilized for a more situationally realistic setting of response thresholds, e.g. for an antilock system.

Since lower vehicle retardations can be achieved using the rear wheels than using the front wheels, it is advantageous if the test braking phases are carried out in the "sequence" the test phase is carried out on a rear wheel when a vehicle driver seeks braking with moderate vehicle retardation between 0.1 g and 0.2 g, and on a front wheel when the vehicle driver seeks a somewhat higher vehicle retardation between 0.2 g and 0.4 g or two diagonally opposite vehicle wheels are braked during the test braking phase if the driver seeks a braking retardation of more than 0.4 g or the test braking phase is carried out first on the rear wheel and thereafter on the front wheel.

Furthermore, it is advantageous if, in the case of a performance of the test braking phase on a driven vehicle wheel, the drive train of the vehicle is decoupled from the driven vehicle wheel, in order that a retroaction or reaction of the drive train on the braked vehicle wheel should be excluded.

The driver's wish of "controlled braking" can be recognized alternately or in combination in that the driver actuates the brake pedal of the braking system with a force which is smaller than a predetermined threshold value or in that the vehicle retardation is kept smaller than a settably predetermined threshold value or very precisely also in that the brake pressure which the driver feeds into the braking system by actuating the braking device is smaller than a threshold value.

In place of a tabular input of measured friction/slip value pairs into a memory of an electronic control unit, it is advantageous to generate continuously the tire characteristics determined in accordance with the process according to the present invention such that for the friction coefficient/ slip interrelationship which is determined with reference to at least slip and retardation and which is applicable to a respective vehicle wheel, an algorithm is obtained by interpolation or matching of an approximation relation which can be evaluated by an electronic control unit (50) to characteristic base points of stored $\mu_B/\lambda_B$ value pairs obtained by measurement and stored for a continuous processing of measured $\lambda_B$ data in units of friction coefficient currently utilized and determination of the currently utilized friction coefficient, $\mu_B$, occurs by evaluating the relation $$\mu_B = C_1(1-e^{-C2\lambda_s}) - C_3\lambda_B$$

in which $C_1$, $C_2$ and $C_3$ are constants obtained by matching the relation to measured $\lambda_B$ and $\mu_B$ values and are stored as parameters of the relation used for the continuous evaluation and continuously updated.

With respect to a slip control system suitable for carrying out and applying the above-described process according to the invention, a constructionally simple, space saving and especially functionally reliable configuration of a braking device provided within the context of the braking system of the vehicle and particularly advantageous from the viewpoint of safety is specified by the features of one in which the front wheel brakes (11, 12) connected to a primary output pressure space (56) of the tandem master cylinder (16') and the rear wheel brakes (13, 14) are connected to a secondary output pressure space (57) of the tandem master cylinder (16)', a first bore stage (63) of a housing (64) of the tandem master cylinder (16'), forming a housing-defined boundary of the secondary output pressure space (57), within which first bore state (63) a secondary piston (59) with an outer piston flange (74) delimits the secondary output pressure space (57) in relation to a pressureless downstream chamber (82), an inner piston flange (73) movably sealing off the downstream chamber (82) in relation to an inner portion of the first bore stage (63) an intermediate wall (68) of the housing (64) delimiting the bore stage (63) relative to a central bore stage (66) which extends from a third bore stage (61) receiving a primary piston (58), a cross-sectional area ($A_1$) of the third bore stage (61) is greater than a cross-sectional area ($A_3$) of the central bore stage (66), an actuating piston (69) being displaceably guided in the central bore stage (66) in a pressure tight manner, the actuating piston (69) forming an axially movable, inner boundary of the primary output pressure space (56) relative to a pressureless downstream chamber (86) in the central bore stage (66) which is bounded by the intermediate wall (68), the actuating piston (69) being provided with a thrust rod (71) configured to axially penetrate the central downstream chamber (86) and to pass displaceably in a pressure tight manner through a central bore (72) of the intermediate wall (68) and being axially supported on an inner piston flange (73) of the secondary piston (59), an annular space (96) which is bounded in an axially movable manner by the inner piston flange (73) of the secondary piston (59) and by the intermediate wall (68), centrally penetrated by the thrust rod (71) and is connected to the pressure output (42) of the controllable pressure source (40), an end portion (71') of the thrust rod (71) engages at the secondary piston (59), and is operatively arranged in a blind bore (88) of the secondary piston (59) displaceably in pressure tight manner relative thereto and is supportable on a base (91) of the blind bore (88) and the inner piston flange (73) of the secondary piston (59) has a compensating bore (92) opening centrally in the blind bore (88) at the base (91) and connects the blind bore (88) with the downstream chamber (82), and in which braking device closed braking circuits can be utilized.

By way of a secondary cylinder which is connected between the output pressure space, allocated to the front axle braking circuit of the braking system of the vehicle, of the tandem master cylinder and the main brake line, leading onto the front wheel brakes, of the front axle braking circuit and which acts as pressure converter and which for its part has a control pressure space, into which a controllable output pressure of the control pressure source can be coupled, which output pressure can be additively superposed upon the output pressure which can be generated in the output pressure space of this secondary cylinder just by actuation of the master cylinder, additional variability with respect to the brake force distribution control is achieved. Here, it is advantageous if a specifically associated control pressure output of the control pressure source is allocated to the secondary cylinder.

A pressure sensor can be provided to generate an electrical output signal which is characteristic of the pressure in the tandem master cylinder, such that the driver's intent existing with respect to the desired vehicle retardation is recognizable in a simple manner.

Pressure sensors can also be provided to generate electrical output signals which are characteristic of the control pressure made available at the respective pressure output of the control pressure source or electrical output signals which are characteristic of the brake pressures coupled into the individual wheel brakes. These electrical output signals are fed as information inputs to the electronic control unit and permit an accurately metered pressure allocation to the individual wheel brakes while maintaining optimal dynamic stability of the vehicle.

Both for the recognition of situations of travel on a bend and also for the control of the brake force distribution to the individual vehicle wheels in the sense, for example, of a uniform utilization of friction on all vehicle wheels, it is advantageous if the vehicle is equipped with a transverse acceleration sensor and/or a yaw angle sensor to generate electrical output signals which can be processed by the electronic control unit of the slip control system.

To recognize the driver's intent of "controlled braking" or "full braking", it is also advantageous if a force sensor is provided to generate an electrical output signal characteristic of the force with which the driver actuates the brake pedal of the braking system and by which, if the signal level exceeds a threshold value, the performance of a test braking phase is interrupted or the initiation thereof is prevented from the outset.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
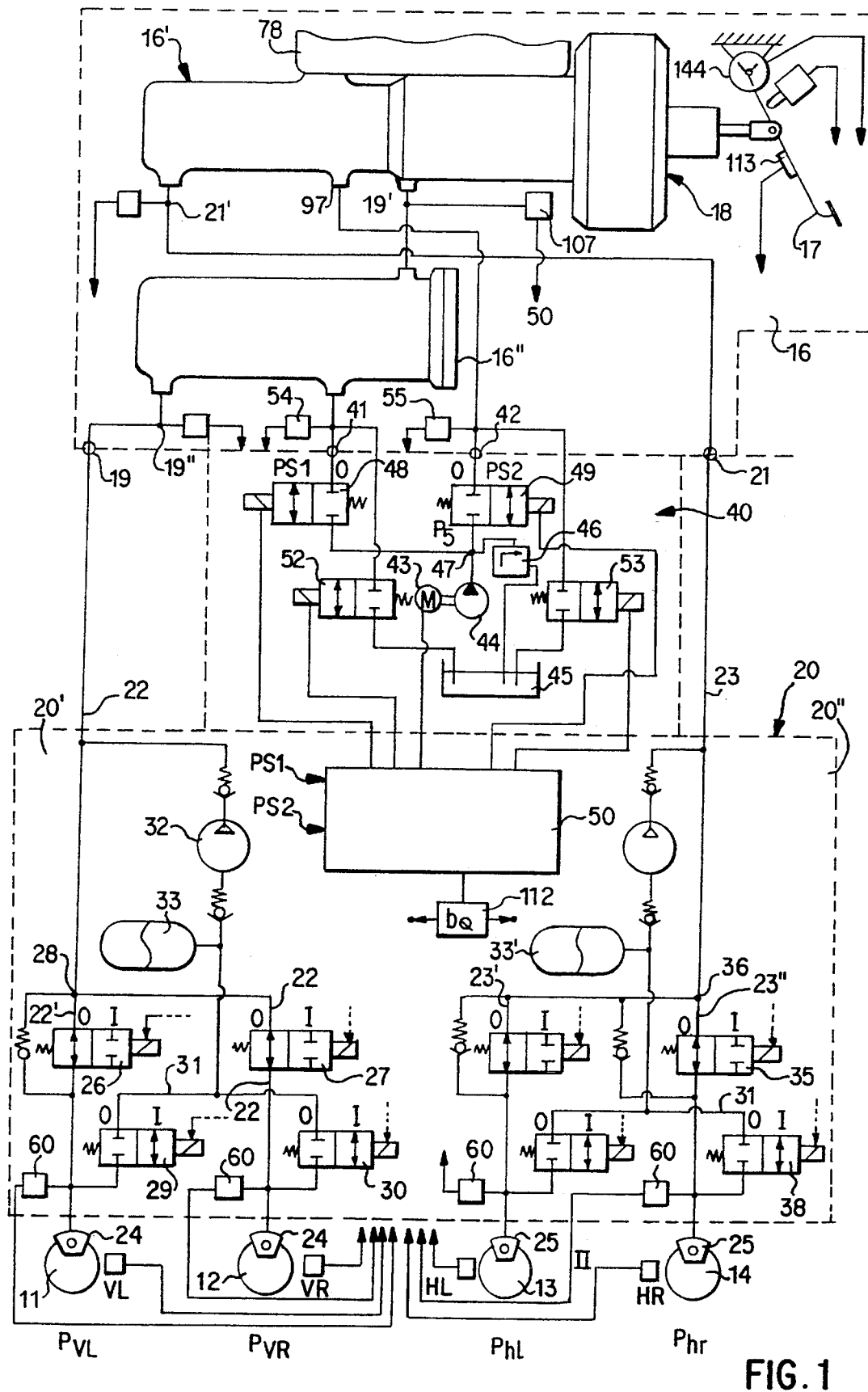
FIG. 1 is a schematic view of a hydraulic dual circuit braking system for a vehicle equipped with a brake slip control system according to the present invention.

The basic construction of a hydraulic dual circuit braking system shown in FIG. 1 is designated generally by the numeral 10 and is used on a road vehicle which is equipped with a complex slip control system to permit the vehicle, irrespective of the possibility of a utilization of high vehicle accelerations and vehicle retardations in the statistically significant travel situations, to have a high degree of dynamic stability and thus safety in the traction mode. This slip control system provides the functions both of an antilock system (ABS), and also those of a drive slip control (ASR), as well as those of an—electronic—brake force distribution control (EBKV), which is suitable to impress upon the vehicle desired brake force distribution which can correspond, for example in the case of a partial braking, to the utilization of increased rear axle brake force components and, in the case of a full braking, to an ideal brake force distribution which essentially corresponds to equal utilization of friction at the—braked—front and rear wheels of the vehicle.

Over and above the foregoing, the slip control system is configured such that the wheel brakes are automatically activatable in any selectable combination and independent of the traction mode, whether it be that the vehicle is in accelerated or retarded travel or in a travel at uniform speed, the individual contributions of the brake forces delivered via the wheel brakes being individually settable.

In order to achieve these functions, the braking system 10 is constructed in the hereinafter described manner in which reference is also made to FIG. 2.

For the purpose of the explanation, it is assumed that the vehicle has a rear axle drive in which the possibility of an automatic "interruption" of the drive train is provided, whether this be in that the vehicle has an automatic gear which can be automatically switched to idling during travel, especially in the braking mode of the vehicle, or in that in the event that the vehicle is equipped with a gear mechanism, an electrically controllable release and re-engagement of the clutch to connect the engine and the gear to one another is possible.

The conventional devices which are required to release the clutch and to engage the idling setting of an automatic gear are, for the sake of simplicity of representation, not shown in the figures of the drawing.

As regards the braking system 10, for the purpose of explanation, it is further assumed that the left front wheel brake (VL) 11 and the right front wheel brake (VR) 12 are combined into a front axle braking circuit I and the left rear wheel brake (HL) 13 and the right rear wheel brake (HR) 14 are combined into a rear axle braking circuit II.

A braking device of the braking system 10 is provided for the brake pressure supply to the two braking circuits I and II and is designated generally by the numeral 16. The braking device 16 has a pressure output 19 which is allocated to the front axle braking circuit I and to which the main brake line 22, branching towards the front wheel brakes 11 and 12, of the front axle braking circuit I is connected, and a pressure output 21, which is allocated to the rear axle braking circuit II and to which the main brake line 23, branching towards the rear wheel brakes 13 and 14, of the rear axle braking circuit II is connected. The device 16 comprises a specially configured stepped tandem master cylinder 16' shown in greater detail in FIG. 2 and actuatable by a brake pedal 17 via a brake force intensifier 18, which can be a hydraulic or a pneumatic brake force intensifier. The tandem master cylinder 16 has a pressure output 19', which is allocated to the front axle braking circuit I and to which a secondary cylinder 16" which essentially functions as pressure converter is connected. The pressure output 19" of the secondary cylinder 16" is directly connected to the pressure output 19 of the braking device 16 allocated to the front axle braking circuit I. The tandem master cylinder 16' also has a pressure output 21', which is allocated to the rear axle braking circuit II and which is directly connected to the pressure output 21 of the braking device 16 allocated to the rear axle braking circuit II or directly forms that pressure output.

The brake calipers 24, 25 respectively of the respective front wheel brakes 11, 12 and the rear wheel brakes 13, 14, which are all constructed as disc brakes, dual-piston calipers which are identically configured at the front wheel brakes. The rear wheel brakes likewise have an identical configuration which, however, differs from that of the front wheel brakes, and which is specified in the sense of a fixed coordination of the front axle/rear axle brake force distribution with respect to dynamically stable retardation behavior of the vehicle within the entire braking range, i.e. partial braking to full braking.

It is, however, understood that in place of dual-piston calipers 24, 25, it would also be possible to use four-piston brake calipers with, in each instance, two pairs of pistons. In this arrangement, only one pair of pistons of the brake calipers 24, 25, respectively per brake could be used for a "normal" braking, i.e. a braking taking place without slip control, and the further pairs of pistons could be used for slip control.

The vehicle is equipped with an antilock system (ABS) which is represented by its electrohydraulic control unit designated generally by the numeral 20 in FIG. 1.

In order to be able to keep the braking circuits I and II closed, the specific embodiment of the antilock system 20 operates in accordance with the return principle, according to which brake fluid discharged in brake pressure reduction phases of the antilock control from the front wheel brakes 11 and/or 12 and respectively the rear wheel brakes 13 and/or 14 is pumped again into the main brake line 22 and/or 23 of the front axle braking circuit I or of the rear axle braking circuit II and via these back to the braking device 16.

This antilock system is, 12 and respectively 13, 14 of the respective braking circuits I and II, "counterphase" brake pressure changes are possible. That is at the one wheel brake 11 or 12 or 13 or 14 of the respective braking circuit I or II, brake pressure can be reduced or built up, while at the other wheel brake of the respective braking circuit I or II brake pressure is built up again.

Accordingly, within the electrohydraulic control unit 20 of the antilock system there are provided the subunits 20' and 20" which are individually allocated to with the front axle braking circuit I and the rear axle braking circuit II, which, with regard to each, permit a counterphase brake pressure reduction or brake pressure increase, explained in the above sense, at the left front wheel brake 11 and the right front wheel brake 12 or respectively the left rear wheel brake 13 and the right rear wheel brake 14 of the vehicle.

The subunit 20', allocated to the front axle braking circuit I, of the electrohydraulic control unit 20 of the antilock system comprises, in known circuit arrangement 2 of the left front wheel brake 11 and the right front wheel brake 12, the individually allocated inlet valves 26, 27, by way of which the brake line branches 22', 22", which proceed from the branching location 28 of the main brake line 22 of the front axle braking circuit I and which lead to the individual wheel brakes 11 and 12, can be individually cleared and shut off. These inlet valves 26, 27 are, in the embodiment shown, configured as 2/2-way magnetic valves, the neutral position 0 of which is their throughflow position. The front wheel brakes 11, 12 are communicatively connected to that pressure output 19 of the braking device 16 which is allocated to the front axle braking circuit I and the excited position I of which is their shut-off position, in which the front wheel brakes 11, 12 are shut-off against the branching location 28 of the main brake line 22 of the front axle braking circuit I and thus also against that pressure output 19 of the braking device 16 which is allocated to that braking circuit.

The subunit 20' of the electrohydraulic control unit 20 of the antilock system further comprises outlet valves 29, 30 which are each individually allocated to the front wheel brakes 11, 12 and by way of which the two front wheel brakes 11, 12, either individually or together, can be connected to a return line 31 of the front axle braking circuit I. From the return line, brake fluid discharged by a return pump 32 allocated to the front axle braking circuit I in brake pressure reduction phases of the brake pressure control at at least one of the front wheel brakes 11 and/or 12 can be pumped back into the main brake line 22 of the front axle braking circuit I and via brake line into the braking device 16.

The outlet valves 29, 30 of the front axle braking circuit I are, according to FIG. 1, configured as 2/2-way magnetic valves, the neutral position 0 of which is their shut-off position, in which at least one of the wheel brakes 11, 12 is shut off against the return line 31, and the excited position I of which is their throughflow position, in at least one of the wheel brakes 11, 12 of the front axle braking circuit I is connected to the return line 31.

A low pressure reservoir 33 is connected to the return line 31 of the front axle braking circuit I and is configured as a piston-spring reservoir which can quickly receive brake fluid discharged in brake pressure reduction phases which take place at the front axle braking circuit I, in order to be able to achieve the required rapid pressure relief of the respective front wheel brake 11 or 12; in this case, the return pump 32, which is connected via an input non-return valve to the low pressure reservoir 31 and via an output non-return valve to the main brake line 22 of the front axle braking circuit I, pumps back the discharged brake fluid, if required, from the low pressure reservoir 33 into the braking device 16.

With circuit connection and function similar to the front axle subunit 20', the subunit 20' of the electrohydraulic control unit 20 of the antilock system which is allocated to the rear axle braking circuit II comprises inlet valves 34, 35 which are individually allocated to the rear wheel brakes 13 and 14 and by way of which the brake line branches 23', 23" leading on from a branching location 36 of the main brake line 23 of the rear axle braking circuit II to its wheel brakes 13 and 14 can be in each instance individually cleared or shut off. The rear axle subunit 20' comprises outlet valves 37 and 38, which are individually allocated to the wheel brakes 13, 14 of the rear axle braking circuit II and by way of which the wheel brakes 13, 14 of the rear axle braking circuit II can be connected individually or together to a return line 31' of the rear axle braking circuit II or respectively can be shut off against this, as well as a return pump 32' allocated to the rear axle braking circuit II and a low pressure reservoir 33' connected to the return line 31' of the rear axle braking circuit II, from which pump/reservoir brake fluid discharged in brake pressure reduction phases which are required at the rear axle braking circuit II can be pumped back into the drain line 23 of the rear axle braking circuit II or respectively that functional part of the braking device 16 of the braking system 10 which is allocated to that braking circuit.

The return pumps 32 and 32' of the respective front axle braking circuit I and rear axle braking circuit II can, in a manner not specifically shown, be configured as piston pumps, especially as free piston pumps, which have a common eccentric drive.

Within the context of the slip control system of the braking system 10, there is further provided a control pressure source which is designated generally by the numeral 40 and which has a control pressure output 41 allocated to the front axle braking circuit I and a control output 42 allocated to the rear axle braking circuit II. At these outputs, defined, if required, differing pressures $P_{s1}$ and/or $P_{s2}$ can be made available; in this case, these pressures $P_{s1}$ and $P_{s2}$ can be raised and lowered in accordance with a desired time behavior.

A pressure generating pump 44 which is driveable by an electrical drive motor 43 has a throughput quantity which is assumed to be proportional to the speed of rotation. The electric motor 43 is controllable with respect to the speed of rotation, at least as a function of the frequency of a pulsed operating voltage or the level of the supply voltage with which the electric motor 43 is operated.

Expediently, the control pressure source 40 operates with brake fluid as the pressure medium, for which a specifically associated supply container 45 of the control pressure source 40 is provided.

The control pressure source 40 is provided with a pressure limiting valve 46, which limits the output pressure $P_s$ made available at the high pressure output 47 of the pump 44 to a value of a maximum of approximately 80 bar.

Between the high pressure output 47 of the pump 44 and the control pressure outputs 41, 42 of the control pressure source 40 there is connected in each case an outlet control valve 48, 49 respectively, for controlling the pressures $P_{s1}$, $P_{s2}$, which can be made available at the control pressure outputs 41 and 42 of the control pressure source 40. These outlet control valves 48, 49 are 2/2-magnetic valves which can be driven in a pulsed manner by electrical output signals of an electronic control unit 50 which is provided as the central control unit of the slip control system 10 and also generates the electrical output signals which are required for driving the inlet valves 26, 27 and 34, 35 and the outlet valves 21, 30 and 37, 38 of the electrohydraulic brake pressure control unit 20 of the antilock system and which are obtained from a comparative as well as differentiating processing of output signals of wheel speed-of-rotation sensors 51 which are individually allocated to the vehicle wheels and the output signals of which include, on the basis of level and/or frequency, the information on the vehicle wheel dynamic behavior, namely wheel circumference speed, acceleration and retardation.

Between the respective control pressure outputs 41, 42 of the control pressure source 40 and its supply container 45, there is further connected a pressure reducing control valve 52, 53 respectively, by, for example, pulsed drive and the Like of which, using output signals of the electronic control unit 50, the output pressures prevailing at the control pressure outputs 41, 42 of the control pressure source 40 can be reduced. The pressure reducing control valves 52, 53 are also configured as 2/2-way magnetic valves.

The neutral positions 0 both of the outlet control valves 48, 49 and the pressure reducing control valves 52, 53 of the control pressure source 40 are their shut-off positions, in which, on one hand, the high pressure output 47 of the pump 44 is shut off against the pressure outputs 41, 42 of the control pressure source 40, on the other hand, the control pressure outputs 41, 42 of the control pressure source 40 are shut off against its supply container 55. Alternatively, their throughflow positions I are the excited positions in which the control pressure outputs 41, 42, alternatively or together, are connected to the high pressure output 47 of the pump, or, are connected to the supply container 45 of the control pressure source 40.

To pick up the output pressures $P_{s1}$, $P_{s2}$ made available at the respective control pressure outputs 41, 42 of the control pressure source 40, there is provided in each case a pressure sensor 54, 55, respectively. The pressure sensors 54, 55 generate electrical output signals which are characteristic of these pressures $P_{s1}$, $P_{s2}$, are fed to the electronic control unit 50 and can be processed by the latter.

As further information inputs, there are fed to the electronic control unit 50 for processing the output signals of the brake pressure sensors 60 which are individually allocated to the wheel brakes 11 to 14. The electrical output signals are characteristic of the brake pressures $P_{lf}$, $P_{rf}$ coupled into the front wheel brakes 11, 12 as well as of the brake pressures $P_{lr}$, $P_{rr}$ coupled into the rear wheel brakes 13, 14.

Figure 2:
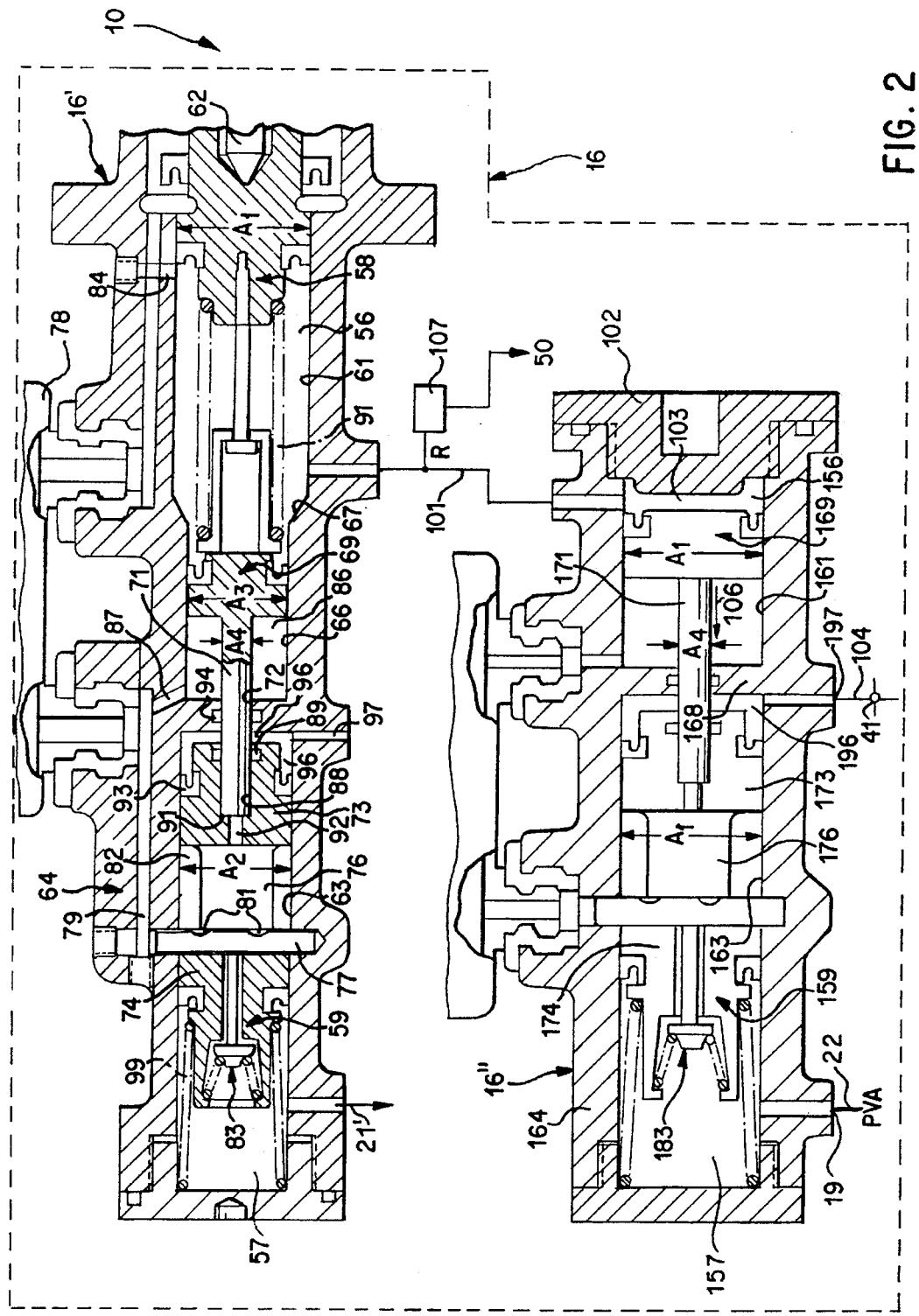
FIG. 2 is a partial cross-sectional view of a braking device which can be used with the braking system according to FIG. 1.

For the explanation of structural details of the braking device 16 shown schematically in FIG. 1, reference is now made FIG. 2. The tandem master cylinder 16' is configured as a so-called step master cylinder, in which the primary piston 58 forming the one axially movable limit of a primary output pressure space 56 and the secondary piston 59 forming the axially movable limit of a secondary output pressure space 57 have different cross-sectional areas $A_1$ and $A_2$, with the cross-sectional area $A_1$ of the primary piston 58 being the greater than $A_2$.

At the primary piston 58 which is guided displaceably in pressure tight fashion in a bore stage 61, the actuating force intensified by the brake force intensifier 18 engages via a pressure rod 62. In a bore stage 63 of a master cylinder housing designated generally by numeral 64, the secondary piston 59 forming the axially movable limit of the secondary output pressure space 57 is guided displaceably in pressure tight fashion. A further, central bore stage 66 extends between the bore stage 61 and the bore stage 63, and via an annular shoulder 67, adjoins the bore stage 61 forming the housing-fast, radial limit of the primary output pressure space 56 and is delimited by an intermediate wall 68 of the cylinder housing 64 in relation to that bore stage 63 in which the secondary piston 59 is guided displaceably in pressure tight fashion.

In this central bore stage 66, there is guided displaceably in pressure tight fashion an actuating piston 69 which forms the inner axially movable limit of the primary output pressure space 56 and which can be supported, via a slim axial pushrod 71, which passes displaceably in pressure tight fashion through a central bore 72 of the intermediate wall 68 of the master cylinder 64, centrally on an internal piston flange 73 of the secondary piston 59. The "outer" piston flange 74 of the secondary piston 59, directly limiting the secondary output pressure space 57, is connected to the inner piston flange 73 via a slotted piston rod 76. A housing-fast stop tube 77 passes radially through a slot of the piston rod 76, which tube 77 communicates with a housing channel 79 leading to the brake fluid supply container 78 and is provided with openings 81, via which brake fluid can flow over into the downstream chamber 82 extending between the two piston flanges 73, 74 of the secondary piston 59.

The secondary piston flange 74, movably limiting the secondary output pressure space 57, is provided with a central valve which is designated generally by numeral 83 and which in the illustrated neutral position of the secondary piston 59 corresponding to the unactuated condition of the braking system, is held by abutment action between a thrust rod of its valve body and the stop tube 77 in an open position, so that between the secondary output pressure space 57 and the brake fluid supply container 78 a pressure compensation is possible via the downstream chamber 82. Following a small initial portion of the brake pressure build-up stroke of the secondary piston 59, the central valve 83 passes into its closing position, in which the pressure build-up in the secondary output pressure space 57 occurs. For the corresponding pressure compensation in the primary output pressure space 56 allocated to the front axle braking circuit I, there is provided a compensation bore 84 which communicates with the brake fluid supply container 78. The pressure-space-side mouth opening of the bore 84 is cleared in the neutral position of the primary piston 58, corresponding to the unactuated condition of the braking system 10. After a small initial portion of the brake pressure build-up stroke of the primary piston 58, the bore 84 is shut off against the primary output pressure space 56, after which brake pressure can be built up in the latter space 56 in the course of further piston displacement.

The annular space 86 is penetrated by the axial thrust rod 71 of the actuating piston 69 and is limited axially in housing-fast fashion by the intermediate wall 68 of the housing 64 and in axially movable manner by the actuating piston 69. The annular cross-sectional area of the space 86 is smaller, by the cross-sectional area $A_4$ of the axial thrust rod 71, than the total cross-sectional area $A_3$ of the actuating piston 69, on which cross-sectional area the latter can be acted upon by the pressure generated in the primary output pressure space 56. The annular space 86 is permanently connected via a further housing channel 87 to the brake fluid supply container 78 and is accordingly kept pressureless.

Figure 3:
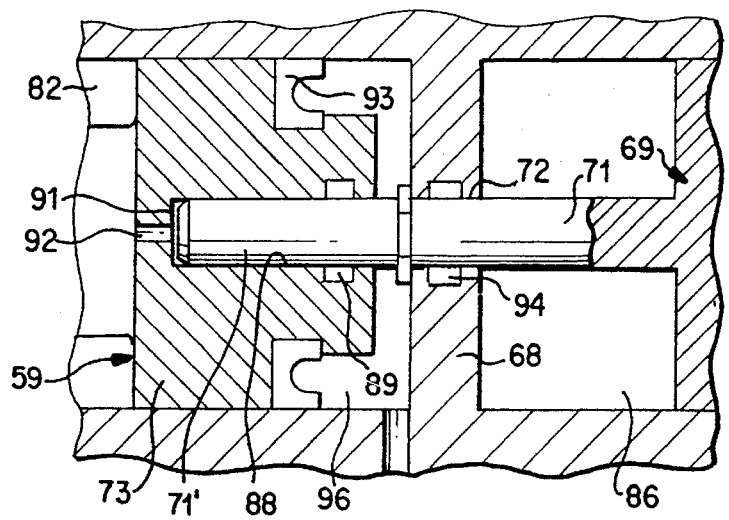
FIG. 3 is a partial cross-sectional view of the tandem master cylinder of the braking device according to FIG. 2.

The inner piston flange 73 of the secondary piston 59 is provided with a blind bore 88 which is open towards the intermediate wall 68 of the housing 64 as best seen in FIG. 3. In the bore 88, the free end portion 71' of the axial thrust rod 71 of the actuating piston 69 is guided displaceably in pressure tight fashion. An annular seal 89 providing the necessary sealing between the thrust rod 71, 71' and the secondary piston 59 is disposed in piston-fast fashion at that side of the secondary piston flange 73 which faces the intermediate wall 68 of the housing.

In the neutral position of the secondary piston 59 and of the actuating piston 69 illustrated in FIG. 2, thrust rod 71 is axially supported by the end face of its end portion 71' on the base 91 of the blind bore 88.

A smaller diameter bore opens into the blind bore 88 of the inner piston flange 73 of the secondary piston 59. Via the bore 92, upon relative movement between the secondary piston 59 and the actuating piston 69, brake fluid can flow out of the downstream chamber 82 into the blind bore 88 or respectively can be displaced out of the bore 88 into the downstream chamber 82.

One side of the annular space 96 is sealed off by the piston-fast annular seal 89 radially inwardly and by means of a sealing sleeve 93 of the inner piston flange 73 radially outwardly against the downstream chamber 82, and the other side of the space 96 is sealed off from the pressureless annular space 86 by the housing-fast annular seal 94, which is disposed within the central bore 72 of the intermediate wall 68 which is axially penetrated by the free end portion 71' of the thrust rod 71 of the actuating piston 69. The annular space 96 is connected, as seen in FIG. 1, via a control connection 97 to that control pressure output 42 of the control pressure source 40 which is allocated to the rear axle braking circuit II and thus forms a control pressure space which is acted upon by the output pressure $P_{s2}$ of the control pressure source 40 such that the brake pressure which can be coupled in via the pressure output 21' of the secondary output pressure space 57 of the tandem master cylinder 16' into the rear wheel brakes 13 and 14 is variable in a controlled fashion, whereby the front axle/rear axle brake force distribution is correspondingly variable.

The primary piston 58, the secondary piston 59 and thus also the actuating piston 69 are urged by restoring springs 98, 99 into their respective neutral positions marked by abutment action in particular, the restoring spring 98 engaging at the primary piston 58 engages at the actuating piston, the neutral position of which is thus marked by its axial support on the base 91 of the blind bore 88 of the secondary piston. The neutral position of the secondary piston 59 is in turn marked by rearward abutment of its outer piston flange 74 on the stop tube 77 and, for this reason, the restoring spring 99 of the secondary piston 59 must be somewhat more powerful than that of the primary piston 58.

The secondary cylinder 16", which further belongs to the braking device 16, has the pressure output 19 Connected to the main brake line 22 of the front axle braking circuit I. In terms of its construction, the secondary cylinder 16" is to a large extent similar to the tandem master cylinder 16', and provides in the "normal" braking process, i.e. that not subjected to a slip control operation, the function of a 1/1 pressure converter which transmits the brake pressure built up in the primary output pressure space 56 on actuation of the tandem master cylinder 16' to the pressure output 19 in a substantially undiminished way.

To the extent that constructional and functional elements of the secondary cylinder 16" are provided with reference numerals which are increased by 100 as against the reference symbols employed for constructional and functional elements of the tandem master cylinder 16', this is intended to signify a reference to the identity or similarity of construction of the thus designated elements and at the same time also to include a reference to the description of these functional elements which is given with reference to the tandem master cylinder 16' in order to avoid repetitions. The description of the secondary cylinder 16' is thus essentially restricted to the differences existing in relation to the tandem master cylinder 16' of the braking device 16.

The pressure space 156 functionally corresponds to the primary output pressure space 56 of the tandem master cylinder 16' and is axially movably limited by an actuating piston 169 which functionally corresponds to the actuating piston 69. The pressure space 156 has the function of an input pressure space which is in constant communication via a connecting line 101 with the primary output pressure space 56 of the tandem master cylinder 16'. This input pressure space 156 is sealed off, not by an axially movable primary piston 58 but, by a housing-fast cylinder sealing part 102 which is fitted in pressure tight fashion to the housing 164. In the neutral position of the secondary piston 159 and of the actuating piston 169, corresponding to the unactuated condition of the braking system 10, the secondary piston 159 of the secondary cylinder 16' and of the actuating piston 169], the actuating piston 169 is axially supported via an only slightly extended abutment continuation 103 in the axial direction directly on the housing sealing part 102.

The bore stage 161, in which the actuating piston 169 is guided displaceably in pressure tight fashion, has in terms of magnitude the same cross-sectional area $A_1$ as the bore stage 61 of the tandem master cylinder 16', in which bore stage its primary piston 58 is guided displaceably in pressure tight fashion.

Furthermore, the bore stage 163 is delimited in relation to the bore stage 161 containing the actuating piston 169 displaceably in pressure tight fashion by the intermediate wall 168. Within the bore stage 163, the secondary output pressure space 157 of the secondary cylinder 16" is axially movably limited by the outer piston flange 174 of the secondary piston 159. Through the inner piston stage 173 which is fixedly connected by the slotted piston rod 176 to the outer piston stage 174, the annular space 196 which is axially penetrated by the axial thrust rod 171 of the actuating piston 169 is axially movably limited. The bore space 163 has the same cross-sectional area $A_1$ as the input pressure space 156 of the secondary cylinder 16" or of the primary output pressure space 56 of the tandem master cylinder 16' of the braking device 16. The annular space 196 is connected via its control connection 197 and a connecting line 104, if required, to the control pressure output 41 of the control pressure source 40 which is allocated to the front axle braking circuit I.

In the event of a braking of the vehicle which is controlled by actuation of the brake pedal 17, the pressure $P_v$ which is coupled out of the primary output pressure space 156 of the tandem master cylinder 16' into the input pressure space 156 of the secondary cylinder 16", brings about a situation in which a force is exerted on the actuating piston 169 in the direction of the arrow 106 (FIG. 2), i.e. in that direction of displacement of the actuating piston 169 and of the secondary piston 159 coupled in terms of movement with the latter via the thrust rod 171. The magnitude of that force is given by the product $A_1 \cdot P_v$, whereby the secondary piston 159 is displaced in the direction of the arrow 106 and, following a small initial portion of this displacement stroke, the central valve 183 passes into its shut-off position, so that from then on in the secondary output pressure space 157 of the secondary cylinder 16" a pressure $P_{VA}$ is built up. In terms of magnitude, that pressure $P_{VA}$ corresponds to, or almost corresponds to, the pressure $P_v$ built up in the primary output pressure space 56 of the tandem master cylinder 16' and is coupled in as brake pressure into the front axle braking circuit I.

By coupling in the pressure $p_{s2}$ settable in a defined manner at the control pressure output 42 allocated to the rear axle braking circuit II, which is the braking circuit of the driven vehicle wheels, into the annular space 96 of the tandem master cylinder 16', the rear wheel brakes 13 and 14 are acted upon with brake pressure even when the driver does not actuate the brake pedal 17 of the tandem master cylinder 16'. As a result of this arrangement, the driven rear wheels of the vehicle have a drive slip control which operates in accordance with the principle of again retarding a vehicle wheel inclining to spin by controlled activation of its associated wheel brake, in order thereby to transmit torque to the vehicle wheel which is not tending to spin. The selection of the vehicle wheel to be braked takes place in that, while the control pressure source 40 is activated to generate control pressure at the control pressure output 42, the inlet valve 34 or 35, which is allocated to the respective rear wheel brake 13 or 14 to be actuated, is held in its neutral position, while the inlet valve 35 or 34 of the wheel brake 14 or 13 of the rear wheel which is not tending to spin is switched over into its shut-off position I. In this situation, the electronic control unit 15 generates the required drive signals from processing, in a known manner, the output signals of the wheel speed-of-rotation sensors 60 individually allocated to the vehicle wheels.

Even during a braking process controlled by the driver by actuation of the brake pedal 17, additional brake pressure can be fed into the rear wheel brakes by having pressure act on the annular space 96 of the tandem master cylinder 16', in order to achieve in the partial braking range, i.e. at relatively low vehicle retardations at which the maximum utilizable coefficient of friction between the roadway and the braked vehicle wheels is not fully utilized, an increased rear axle brake force component so as not to stress unnecessarily the front wheel brakes by keeping their thermal stressing as low as possible and distributing the brake loading more uniformly to the front wheel brakes 11, 12 and the rear wheel brakes 13 and 14.

Likewise, it is also possible to activate the wheel brakes 11 and 12 of the non-driven front wheels of the vehicle or to act on them with a brake pressure which is higher than the output pressure $P_v$ generated at the pressure output 19' of the tandem master cylinder 16' in the event of an actuation of the braking system, such that, into the annular space 196 of the secondary cylinder 16", a control pressure $P_{s1}$ is coupled and is made available at a defined level or with a defined rate of rise at that control pressure output 41 of the control pressure source 40 which is allocated to the front axle braking circuit I.

Such a coupling-in of control pressure $P_{s1}$ into the annular space 196 of the secondary cylinder 16" can become necessary in the course of a braking controlled by the driver by actuation of the brake pedal 17, in order to achieve a desired, correctly situation-related front axle/rear axle brake force distribution. An activation, taking place independently of a braking controlled by the driver, of at least one of the wheel brakes 11 and/or 12 of non-driven front wheels of the vehicle can become necessary in circumstances in which, by way of example in a neither accelerated nor retarded situation of the vehicle travelling on a bend, it is possible to take account of an oversteering behavior of the vehicle and a risk of skidding associated therewith only in that at the front wheels of the vehicle a brake slip is built up, which at the same time results in a reduction of the lateral guidance force of the front wheels, so that the vehicle is indeed to some extent "taken out of the curve", but nevertheless still remains steerable.

An activation, independent of an actuation of the braking system 10 by way of the brake pedal 17, both of the front wheel brakes 11 and 12 and also of the rear wheel brakes 13 and 14 is also necessary in circumstances in which the vehicle is equipped with a "distance control" which is intended to initiate an activation of the braking system 10 as a function of the distance to a preceding vehicle, which distance can be picked up by a sensor system when this distance falls below a critical value.

The above explained functional characteristics of the braking system 10, essentially the possibility provided in this system of being able to alter the front axle/rear axle brake force distribution in a defined manner within wide limits, in combination with the possibility of being able to couple in differing brake pressures into the individual wheel brakes 11 to 14 by way of the inlet valves 26, 27, 34, 35 and the outlet valves 29 and 30, 37 and 38 of the electrohydraulic brake pressure control unit 20 of the antilock system, and thus being able to feed in correspondingly differing wheel brake forces, allows, in the course of braking processes which become necessary during a journey as well as also of acceleration processes, a continuous determination of the tire characteristics applicable in each instance for the individual vehicle wheels and a utilization of the derived knowledge for a slip control which is suitable, for example, for optimizing the dynamic stability of the vehicle.

For the determination of the tire characteristics, i.e. the interrelationship between a coefficient of friction, $\mu_B$, utilizable at the respective vehicle wheel and the absolute brake slip, $\lambda_B$, which is necessary for the utilization of this coefficient of friction $\mu_B$ and which is defined by the relation $$\lambda_B = \frac{V_F - V_R}{V_F} \quad (1)$$

according to an embodiment of a process which is suitable in this respect and the implementation of which is automatically controlled by the electronic control unit 50, the following procedure is adopted. It is assumed that the braking takes place in the course of a straight travel of the vehicle and the driver would wish to carry out a controlled braking, i.e. a braking in the course of which the driver in the first instance relatively slowly increases, from commencement of the braking, the force $K_p$ with which he actuates the brake pedal 17, until a vehicle retardation of approximately 0.2 g (g=9.81 ms$^{-2}$) has been achieved and the driver thereafter keeps the pedal actuating force $K_p$ constant, in order to maintain the mentioned vehicle retardation for a desired length of time.

In such a situation, in a first braking phase only one wheel brake, e.g. the left rear wheel brake 13, is acted upon by brake pressure $P_{lr}$, which is of such magnitude that the result is the vehicle retardation z desired by the driver. The selection of the rear wheel utilized initially for the braking takes place using the output signals of the electronic control unit 50 to control and switch the inlet valves 26 and 27 of the front wheel brakes 11 and 12 as well as the inlet valve 35 of the right rear wheel brake into their shut-off positions I. In order to achieve, with only the left rear wheel braked and in accordance with the driver's wish, the vehicle retardation z defined by the relation $$z = F_{Blh}/G_g \quad (2)$$

in which $F_{Blh}$ designates the brake force developed by the left rear wheel brake 13 and $G_g$ designates the total weight of the vehicle, it is necessary in a conventional design of a braking system of a passenger car, that the brake pressure coupled into the left rear wheel brake 13 corresponds approximately to 7 times that pressure which is built up in the primary output pressure space 56 of the tandem master cylinder 16' of the braking device 16 of the braking system 10 when the driver actuates the brake pedal 17 of this tandem master cylinder 16' with that actuating force $K_p$ with which he preassociates the desired vehicle retardation z.

Accordingly, in the mentioned, introductory phase of the braking, by activation of the control pressure source 40, a control pressure $P_{s2}$ is coupled via its control pressure output 42 allocated to the rear axle braking circuit II into that annular space 96 of the tandem master cylinder 16' which is allocated to the rear axle braking circuit II. By the action of that control pressure on the annular surface of the internal piston flange 73 of the secondary piston 59 of the tandem master cylinder 16' which is exposed to that control pressure, an additional actuating force is exerted on the secondary piston 59 and acts like a pressure increase in the secondary output pressure space 57 of the tandem master cylinder 16'. As a result, a brake pressure action on the left rear wheel brake 13 which is sufficient for the attainment of the required vehicle retardation is achieved.

In the course of this first phase of a braking which does not necessarily need to be a controlled braking, but can also be a braking in which the driver would wish to achieve the most effective possible vehicle retardation, the control pressure $P_{s2}$ which must be coupled into that annular space 96 of the tandem master cylinder 16' which is allocated to the rear axle braking circuit II is set to approximately 6 times the value of the pressure generated in the primary output pressure space 56 of the tandem master cylinder 16' by pedal actuation. The pressure $P_v$ generated in the primary output pressure space 56 of the tandem master cylinder 16' is monitored by an electronic pressure sensor 107 which generates an electrical output signal characteristic of the pressure $P_v$ prevailing in the primary output pressure space 56 of the tandem master cylinder and which is fed as information input to the electronic control unit 50.

From a comparison of the output signals of the pressure sensor 107 which monitors the primary output pressure of the tandem master cylinder 16', as well as of the pressure sensor 55 which generates an electrical output signal characteristic of the pressure prevailing at the control pressure output 42 of the control pressure source 40, the electronic control unit 50 generates the drive signals for the activation of the motor 43 of the pump 47 as well as for the outlet control valve 49 and, if required, the pressure reducing control valve 53 of the control pressure source by which the pressure given off at the control output 42 is kept to the required value.

In this first or introductory braking phase, the absolute brake slip is determined in accordance with the above relation (1) from an evaluation of the output signals of the wheel speed-of-rotation sensors 51 on a continuous basis. This brake slip can be determined with very great precision, since the output signals, in particular, of the wheel speed-of-rotation sensors allocated to the unbraked front wheels, provide signals which are a very precise measure of the vehicle speed $V_F$.

From a time-differentiating processing of the output signals of the wheel speed-of-rotation sensors 51 allocated to the non-driven front wheels, it is also possible to determine with very great precision the vehicle retardation z which is linked with the wheel brake force $F_{Blh}$ exertable by the braked left rear wheel in accordance with the above relation (2). The brake force satisfies the relation $$F_{Blh} = \mu_{Blh} \cdot F_{GHA}/2 \quad (3)$$

so that the relation $$z = \mu_{Blh} \cdot \frac{F_{GHA}}{2G_g}$$

is also applicable,
in which $F_{GHA}/2$ designates the normal force (wheel load) effective at the braked rear wheel and corresponds to the half rear axle load, and $\mu_{Blh}$ designates the coefficient of friction utilized at the respective retardation and the brake slip $\mu_{Blh}$ linked therewith and is effective between the roadway and the braked vehicle wheel.

The dynamic axle or wheel load displacement occurs in the case of a braking and, for the entire rear axle load $F_{GHA}$, is given by the relation $$F_{GHA} = (\psi - Z \cdot X) \cdot G_g \quad (4)$$

in which $\psi$ designates the rear axle load component related to the vehicle weight $G_g$ and X designates the wheel base-related height of the center of gravity of the vehicle (cf. Burkhardt, Chassis Technology: Brake Dynamics and Passenger Car Braking Systems, Vogelbuchverlag, 1st edition 1991, ISBN 3-8023-0184-6, pages 74 to 80). The following relation directly derives from the relations (2), (3) and (4):

$$\mu_{Blh} = \frac{2z}{\psi - z \cdot \chi} \quad (5)$$

Figure 4:
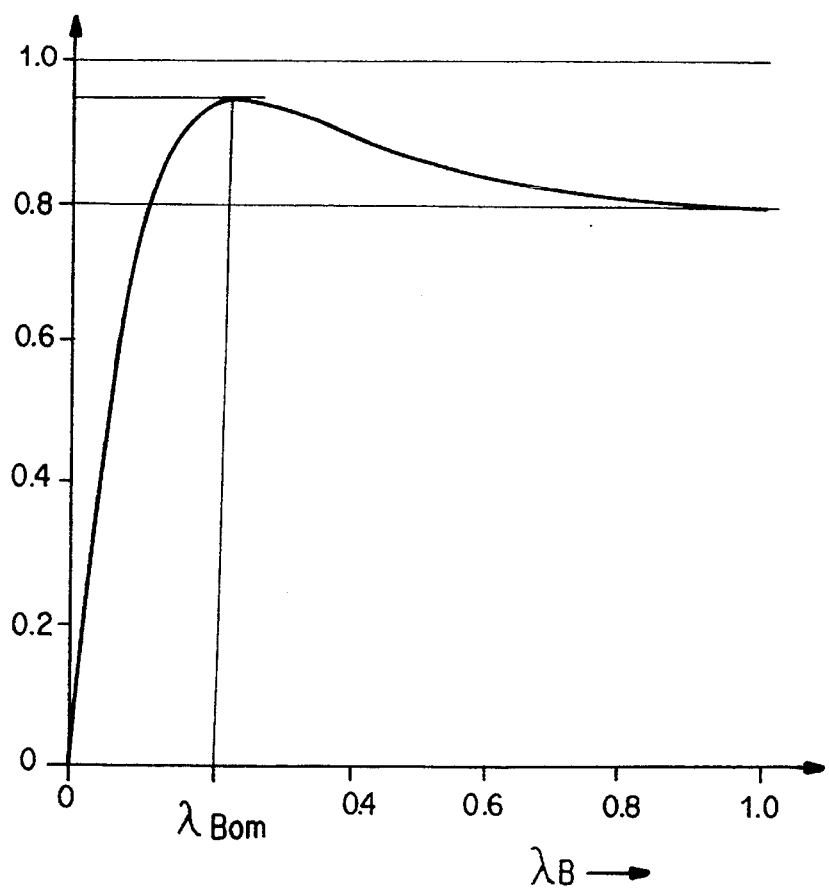
FIG. 4 is a graph of a friction/brake slip tire characteristic to explain the function of the slip control system according to FIG. 1.

By an automatic evaluation, via the electronic control unit 50, of the above relation (5), for the values of the brake slip $\lambda_{Blh}$ which are derived from the output signals of the wheel speed of rotation sensors 51, also the respectively associated coefficient of friction, $\mu_{Blh}$, and thus within the entire slip range of interest the so-called tire characteristic can be determined, for which a typical course is shown in FIG. 4, in which the coefficient, $\mu_B$, is plotted on the ordinate and the absolute brake slip, $\lambda_B$, is plotted on the abscissa.

From that course of the tire characteristic 108 shown in FIG. 4 which is to be regarded as typical for, for example, a normal tire, it can be inferred that with increasing brake slip $\lambda_B$ in the first instance, as represented by the rising leg 109, the utilizable coefficient of friction increases and, at a brake slip, $\lambda_{Bom}$, reaches a maximum value $\mu_{Bax}$, to achieve a maximum vehicle retardation. From this maximum 111 of the tire characteristic 108, the utilizable coefficient of friction, $\mu_B$, decreases again towards larger values of the brake slip $\lambda_B$; this means, for the practical case of a braking, that the brake slip, $\lambda_B$, must not be increased beyond the value, $\lambda_{Bom}$, since otherwise because of the decrease of the utilizable coefficient of friction, the braked wheel to which the tire characteristic 108 corresponds passes very quickly into the locked condition, which does indeed, when the braked wheel is at a standstill and the coefficient of slip $\mu_{BG}$ corresponding to the brake slip 1 is achieved, still permit a thoroughly effective braking of the vehicle. In that case however, dynamic stability of the vehicle is no longer assured and the vehicle is also no longer steerable.

The precise knowledge of the tire characteristic 108, at least its course between the origin of coordinates of the graph of FIG. 4 and the maximum 111 of the tire characteristic 108, is thus a prerequisite for being able to select the response thresholds of a slip control system, e.g. of an antilock system, to be sufficiently high, so that the highest possible values of the coefficient of friction μB are utilizable. Otherwise, however, it is also reliably prevented that the maximum of the tire characteristic 108 is exceeded in the case of a braking and thereby the vehicle could pass into a dynamically unstable condition.

The test phase of the braking, which is carried out for the determination of the tire characteristic 108 as far as its maximum 111 on only one vehicle wheel, is interrupted as soon as the brake slip, $\lambda_{Blh}$, approximates to the value $\lambda_{Bom}$; this is recognized by the electronic control unit 50 in that the vehicle retardation, z, no longer increases, because the value, $d\mu_B/d\lambda_B$, approximates the value 0 and/or in that the braked vehicle wheel is increasingly retarded.

Following the termination of this test phase, the braking is continued conventionally by brake pressure action also on the hitherto not used wheel brakes 11, 12 and 14. Here the brake pressure $P_{lr}$ at the left rear wheel which was the first to be braked is brought, i.e. reduced, to the same pressure level at which the now activated wheel brakes are also acted upon; in this case, in the event that the test braking at one rear wheel of the vehicle has been commenced, this pressure level $P_{hyd}$ is given by the relation $$P_{hyd} = \phi \cdot P_{hydT}/2 \quad (6)$$

in which $\phi$ designates the rear axle brake force component of a brake force distribution assumed to be firmly coordinated and $P_{hydT}$ designates the brake pressure of the wheel brake used in the test phase, at the instant of the interruption of the test phase.

After a "first" tire characteristic 108 has been determined in the above described manner in the course of a next braking the tire characteristic of a second tire is determined, e.g. that of the right rear wheel or, in the event that, as recognized from the manner in which the driver actuates the braking system 10, the driver wishes to brake with somewhat higher vehicle retardation, the characteristic of a front wheel tire is determined in a similar manner; in which case, the relations (4), (5) and (6) are not applicable, and the following relations are applicable:

$$F_{GVA} = (1 - \psi + Z \cdot X) \cdot Gg \quad (4')$$

as well as $$\mu_{BV,r} = \frac{2Z}{1 - \psi + z \cdot \chi} \quad (5')$$

and $$p_{hyd} = p_{hydT} \cdot (1 - \phi)/2 \quad (6')$$

The subscripts "l,r" indicate "left, right".

The sequence of the determinations, taking place from braking to braking, of the tire characteristics can be cyclic, in such a manner that after the determination of the tire characteristic applicable to a rear wheel, that of a front wheel is determined, thereafter that of the other rear wheel and then in turn, of the other front wheel etc. or also in such a manner that, in any case where the manner of actuation of the braking system 10 by the driver reveals that he wishes to brake with relatively high vehicle retardation, the tire characteristic of a front wheel is determined and that of a rear wheel is determined when the driver wishes to brake with relatively low vehicle retardation.

As a result of the continuous determination of the tire characteristics, it is also possible to pick up their changes which occur, for example, as a result of changes of the tire temperature during a journey and which may be considerable. The tire characteristics determined in the course of the test phases of each individual braking in a manner which is, so to speak, at discrete instants from continuously determined pairs of friction/slip values can be filed in a memory of the electronic control unit 50, in tabular form, and can be kept available for a comparison with currently determined slip values. From this comparison, the "stability reserve" which is still available in a dynamic travel situation can be determined in order, inter alia to be able to establish reliably, when travelling on a bend, whether at a given brake slip, and the same applies mutatis mutandis when accelerating on a bend in the case of a traction slip, a sufficient reserve of lateral guidance force is still available, or whether brake slip or traction slip must be reduced in order to be able to steer the vehicle safely through a bend.

A preferred embodiment of the electronic control unit generates the respectively current tire characteristic by matching an exponential function qualitatively corresponding to the characteristic course 108 to a plurality of appropriate base points, e.g. the maximum 111 of the tire characteristic according to FIG. 4 and a plurality of further base points which lie between the maximum 111 and the origin of coordinates. This exponential function is given by the relation $$\mu_B = C_1(1 - e^{-C_2 \lambda_B}) - C_3 \cdot \lambda_B \quad (7)$$

in which $C_1$, $C_2$ and $C_3$ signify constant tire characteristic values which are determined so that the matched curve according to the relation (7) corresponds as well as possible to the measured tire characteristic within the range available for measurement. Values appropriate for determination are, for example the maximum coefficient of friction, $\mu_{Bmax}$, the slip coefficient, $\mu_{BG}$, at $\lambda_B=1$ and the optimal brake slip, $\lambda_{Bom}$, at which the maximum coefficient of friction, $\mu_{Bmax}$ is achieved.

Based on the approximation according to the relation (7), the result is the following $$\mu_{Bmax} = C_I(1 - e^{-C_2 \lambda_{Bom}}) - C_3 \lambda_{Bom} \tag{7.1}$$

$$\mu_G = C_I(1 - e^{-C_2}) - C_3 \tag{7.2}$$

$$\frac{d\mu_B}{d\lambda_B} = C_1 C_2 \cdot e^{-C_2 \lambda_{Bom}} - C_3 \tag{7.3}$$

Equations (7.1) to (7.3) may be solved by a simple iteration, which rapidly leads to a good approximation. The following can be assumed to a first approximation:

$$(C_1)_1 = \mu_{Bmax} \tag{7.4}$$

and, disregarding the quantity $e^{-C_2}$:

$$(C_3)_1 = (C_1)_1 - \mu_G \tag{7.5}$$

giving:

$$(C_2)_1 \cdot e^{-(C_2)_1 \cdot \lambda_{Bom}} = \frac{(C_1)_1 - \mu_G}{(C_1)_1} \tag{7.6}$$

It is possible to determine the characteristic value $(c_2)_1$ approximately from this relation in accordance with an algorithm corresponding to the "regula falsi" or approximation, quickly be means of the electronic control unit 50, giving to a first approximation the relation:

$$(\mu_{Bmax})_1 = (c_1)_1 \cdot [1 - e^{-(C_2)_1 \cdot \lambda_{Bom}}] - (C_3)_1 \cdot \lambda_{Bom}$$

If required, further approximation steps can be executed by the electronic control unit 50 in accordance with simple algorithms.

By the utilization of a characteristic 108 which corresponds substantially to the relation (7) and which can be generated from case to case, a rapid processing of the measured $\lambda_B$ and $\lambda_B$ data can be carried out, as is required for an effective slip control.

In an approximation which is, in most instances, sufficient for practical purposes, it is possible to set a value between 0.2 and 0.3 for the quantity $C_3$ and, for the term to be formed arithmetically:

$$C_1 C_2^2 \cdot 1^{-C_2 \lambda_{Bom}} \text{ approximately 7 a value of}$$

in which case the value $C_2$ can be determined, with $\lambda_{Bom}$ measured, from this expression by simple iteration.

The electronic control unit 50 also has the capability of taking into account transverse accelerations occurring when travelling on bends and "lateral" wheel load displacements resulting therefrom, when braking on a bend, in the pressure allocation to the individual brakes 11, 12, 13 and 14, such that at all braked vehicle wheels a brake force control aimed at equal friction utilization achieves, to this extent, optimal braking of the vehicle. The check-back, required for this purpose, concerning the brake pressures prevailing in the wheel brakes 11, 12, 13 and 14, is achieved by the pressure sensors 60 individually allocated to these wheel brakes.

The information concerning the accelerations occurring when travelling on a bend can be obtained by output signals of a transverse acceleration sensor 112, directly or indirectly, from an evaluation of the differing wheel speeds of rotation of the vehicle wheels and/or by a conventional steering angle sensor (not shown), and possibly also by a conventional yaw angle sensor (also not shown).

Knowing the tire characteristics for straight travel also in principle involves knowing the entire family of tire characteristics which is applicable for a superposition of longitudinal and transverse movements of the vehicle and can be utilized for the determination of lateral force reserves, where a predetermined (as explained, measurable) longitudinal slip is present; in this case, for a traction slip, relations similar to the explanations given for the brake slip are applicable, which can be evaluated by the electronic control unit 50 and can be utilized for the slip control or steering.

In order to permit a reliable recognition of the wish of the driver, i.e. controlled braking or full braking the, brake pedal 17 is also equipped with a force sensor 113, which is constructed, for example, with the aid of strain gauge~ and the electrical output signal of which is likewise fed to the electronic control unit 50. Furthermore, an electrical output signal of an angular setting generator 114 is represents a measure of the pedal position and thus also a measure of the vehicle retardation desired by the driver. From a differentiating processing of the output signal of this angular setting generator 114, the electronic control unit 50 obtains the information as to how fast the driver is actuating the brake pedal 17. If this rate of actuation is very high, then the electronic control unit 50 concludes that the driver wishes to initiate the most effective possible braking with the highest possible braking retardation and, in this case, interrupts the execution of test cycles.

Furthermore, it is advantageous for the recognition of the wish of the driver if the secondary cylinder 16" is also provided at its pressure output 19" with a pressure sensor 116 via which the pressure actually coupled into the main brake line (22) of the front axle braking circuit I can be picked up.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A slip control system for carrying out a process for determining friction/slip characteristics of tires, on a road vehicle equipped both with an antilock system to permit an individual brake pressure control on individual vehicle wheels, comprising an apparatus for electronically controlled distribution of brake forces exertable via front wheel brakes and via rear wheel brakes, a braking device having a tandem master cylinder and a control pressure source with an electrically controllable output pressure configured to be coupled into a control pressure space of the tandem master cylinder and thereby additively superposed upon brake pressure generated by pedal actuation of the braking device alone and is further configured to be coupled into the rear wheel brakes, the control pressure source comprising an electronic control unit configured to generate control signals required for brake force distribution from processing at least wheel speed-of-rotation sensor output signals individually allocated to the vehicle wheels and pressure sensor output signals characteristic of generatable brake pressures wherein the front wheel brakes connected to a primary output pressure space of the tandem master cylinder and the rear wheel brakes are connected to a secondary output pressure space of the tandem master cylinder, a first bore stage of a housing of the tandem master cylinder, forming a housing-defined boundary of the secondary output pressure space, within which first bore stage a secondary piston with an outer piston flange delimits the secondary output pressure space in relation to a pressureless downstream chamber, an inner piston flange movably sealing off the downstream chamber in relation to an inner portion of the first bore stage, an intermediate wall of the housing delimiting the bore stage relative to a central bore stage which extends from a third bore stage receiving a primary piston, a cross-sectional area of the third bore stage is greater than a cross-sectional area of the central bore stage, an actuating piston being displaceably guided in the central bore stage in a pressure tight manner, the actuating piston forming an axially movable, inner boundary of the primary output pressure space relative to a pressureless downstream chamber in the central bore stage which is bounded by the intermediate wall, the actuating piston being provided with a thrust rod configured to axially penetrate the central downstream chamber and to pass displaceably in a pressure tight manner through a central bore of the intermediate wall and being axially supported on an inner piston flange of the secondary piston, an annular space which is bounded in an axially movable manner by the inner piston flange of the secondary piston and by the intermediate wall, centrally penetrated by the thrust rod and is connected to the pressure output of the controllable pressure source.

2. The slip control system according to claim 1, wherein an end portion of the thrust rod of the actuating piston engages at the secondary piston, and is operatively arranged in a blind bore of the secondary piston displaceably in pressure tight manner relative thereto and is supportable on a base of the blind bore.

3. The slip control system according to claim 2, wherein the inner piston flange of the secondary piston has a compensating bore opening centrally in the blind bore at the base and connects the blind bore with the downstream chamber.

4. The slip control system according to claim 2, wherein a secondary cylinder is provided between the output pressure space of the tandem master cylinder allocated to a front axle braking circuit of the braking system of the vehicle and a main brake line to the front wheel brakes, of the front axle braking circuit and acts as a pressure converter, the secondary cylinder having a control pressure space configured to be coupled with a controllable output pressure of the control pressure source which output pressure can be additively superposed upon the output pressure generatable in the output pressure space of the secondary cylinder solely by actuation of the master cylinder.

5. The slip control system according to claim 4, wherein a specifically associated control pressure output of the control pressure course is associated with the secondary cylinder.

6. The slip control system according to claim 2, wherein a pressure sensor is operatively connected to at least one of the pressure outputs, including a pressure output, of the primary output pressure space of the tandem master cylinder, and is configured to generate an electrical output signal characteristic of pressure in the tandem master cylinder and to feed the output signal to the electronic control unit.

7. The slip control system according to claim 1, wherein respective pressure sensors are operatively connected to the control pressure outputs of the control pressure source and are configured to generate electrical output signals characteristic of the control pressure available at the respective pressure output and to feed the output signals to the electronic control unit.

8. The slip control system according to claim 1, wherein respective pressure sensors are operatively associated with each of the front wheel brakes and with each of the rear wheel brakes and are configured to generate electrical output signals characteristic of the brake pressures prevailing in the wheel brakes and to feed the output signals to the electronic control unit.

9. The slip control system according to claim 1, wherein at least one of a transverse acceleration sensor and a yaw angle sensor is operatively arranged with the electronic control unit and configured to generate electrical output signals for evaluation by the electronic control unit in units of transverse forces acting on the vehicle.

10. The slip control system according to claim 1, wherein a force sensor is operatively associated with the electronic control unit and configured to generate an electrical output signal characteristic of a force with which the driver actuates a brake pedal of the braking system and to feed the output signal to the electronic control unit.

* * * * *